United States Patent [19]

Ulbers

[11] Patent Number: 4,717,255

[45] Date of Patent: Jan. 5, 1988

[54] DEVICE FOR MEASURING SMALL DISTANCES

[75] Inventor: Gerd Ulbers, VS-Weilersbach, Fed. Rep. of Germany

[73] Assignee: Hommelwerke GmbH, Fed. Rep. of Germany

[21] Appl. No.: 883,553

[22] Filed: Jul. 9, 1986

[30] Foreign Application Priority Data

Mar. 26, 1986 [DE] Fed. Rep. of Germany ....... 3610154

[51] Int. Cl.$^4$ .................................. G01B 9/02
[52] U.S. Cl. ........................ 356/345; 350/96.12; 356/358; 356/359
[58] Field of Search ............... 356/345, 358, 359, 360; 350/96.11, 96.12

[56] References Cited

U.S. PATENT DOCUMENTS

| | | | |
|---|---|---|---|
| 3,472,597 | 10/1969 | Whitten, Jr. .................... | 356/345 |
| 3,837,728 | 9/1974 | Logan et al. .................... | 350/96.13 |
| 4,120,588 | 10/1978 | Chaam .......................... | 350/96.12 X |
| 4,538,911 | 9/1985 | Heynacher et al. ............... | 356/358 |

*Primary Examiner*—Davis L. Willis
*Assistant Examiner*—Matthew W. Koren
*Attorney, Agent, or Firm*—Allegretti, Newitt, Witcoff & McAndrews, Ltd.

[57] ABSTRACT

A device for measuring small distances, provided with a sensing tip mounted to be movable in the direction of the length to be measured, a transducer for converting the movements of the sensing tip into corresponding electric signals, and indicating means to indicate such signals. The transducer comprises an optical interferometer provided with a measuring waveguide. One end of the waveguide is connected to a laser and the other end to optical means for directing the light onto a measuring mirror disposed at a distance. The light is reflected by the mirror back to the optical means. The measuring mirror is connected to the sensing tip. The interferometer further includes a reference waveguide linked to the measuring waveguide. The reference waveguide has a mirror disposed at one end and a photoelectric transducer at the other end. The transducer is connected to the indicating means for indicating the output signals of the transducer. The device permits a cost-effective and uncomplicated construction as an integrated unit. The device affords precision measurements at accuracies in the range of one half of the wavelength of the laser beam, or even far below such a value. The device also exhibits a high linearity for substantially greater distances. The device is also suitable for measuring extremely rapid changes in length while using a small bearing pressure on the sensing tip.

17 Claims, 4 Drawing Figures

DEVICE FOR MEASURING SMALL DISTANCES

BACKGROUND OF THE INVENTION

The present invention relates to a device for measuring small lengths or distances. Such devices may include a sensing tip which is movable along the length to be measured, a transducer for converting the movements of the sensing tip into a corresponding electric signals, and an indicator for indicating the electrical signals. See claim 1.

Devices of this kind, for measuring small lengths or sections, have been known for some time. For example, a device of this type, in the form of a mechanically inductive transducer, is shown in FIG. 9 of German patent specification No. 11 00 978. The sensing tip of this prior device moves an iron core in a system of coils. The coils are enclosed in a measuring bridge which supplies an electric output signal. The output signal is dependent on the movements of the sensing tip. The relatively heavy weight of the iron core being moved, however, substantially reduces the speed at which the device may measure distances. In addition, the weight of the iron core subjects the sensing tip to a great deal of wear, and this wear becomes even more acute the finer, or more delicate, the sensing tip is. Such delicate sensing tips, however are required to properly sense the fine structure of a surface. Another disadvantage of the foregoing device is its limited linearity, especially when it is executing large measuring strokes.

SUMMARY OF THE INVENTION

The object of the present invention is to provide a device of the type discussed above which is for measuring small distances or lengths. The movable parts of such a device should be relatively light weight. The sensing tip of the device may be have a small rounding off radius. Thus, the device exhibits a high sensing speed in sensing the fine structure of a surface. This enables the device to exhibit a high degree of linearity when the device is executing large measuring strokes.

This is accomplished by the teachings set forth in the characterizing clause of claim 1.

The invention is based on the principle that the position and/or the movements, respectively, of the mechanical sense organ for sensing a given length, or distance, can be achieved practically weightlessly by an optical method. According to the present invention, optical phase measurements are taken with the assistance of a reflecting surface disposed at the sense organ. The optical phase measurement is performed by means of an interferometer of the type described, in part, in the publication "Laser und Optoelektronik", Vol. 1, 1984, page 19, FIG. 3. This known interferometer was, however, modified so that the light from the measuring waveguide is deflected by optical means, passed onto the reflector connected to the sensing tip (or sensor), and returned the same way by the reflector to the measuring waveguide. Except for the means for holding and guiding the sensing tip, no other weight is placed on the sensing tip. Thus, the weight on the sensing tip is minimized, and only a small amount of bearing pressure is necessary to enable the sensing tip to accurately follow the particular configuration of a surface. Such accurate following is required, for example, to sense the fine contours of the surface of a workpiece and to sense and determine any changes in length that correspond to the surface contour. Any such length variations are subsequently converted by the interferometer into electric signals. The sensing speed may be selected to be very high.

The optical means for shutting out or deflecting the light on the measuring waveguide consists preferably of a diffraction grating generally of the type described in the periodical "LASER MAGAZINE", No. 4, 1985, page 75. The disclosed device is used in connection with a scanner for sensing phonographic records with optical recording grooves. However, other optical means for focusing the light from the measuring waveguide onto the reflector are also suitable. Preferably, the light is in the form of parallel rays or parallel beams (bundle of rays). However, in some cases, a partial or complete focusing onto the measuring reflector (or mirror) may be appropriate and called for.

The movable mounting means of the sensing tip may take the form of a two-arm lever, with the sensing tip being attached to the end of one arm and the measuring mirror to the other arm. It is also possible to use a one-arm lever, with the mirror being disposed in the region of the sensing tip. This has the advantage that the mass being moved by the deflections of the sensing tip is further reduced. The measuring mirror may also be disposed at one end of a parallel extending measuring rod, the other end of which having the sensing tip affixed thereto.

With both types of the movable mounting of the sensing tip, and particularly with the lever type mounting, it has been found most useful for the measuring mirror to take the form of a triple mirror or a glass sphere. Such an arrangement helps ensure that the light is always reflected in the same direction back to the optical means, even if changes in the angular position of the measuring mirror occur. In this way the optical means may shunt or deflect light out of the measuring waveguide as well as cause the the light to return.

For length measurements in the range of one half of the wavelength of the light emitted by the laser, an indicator in the form of a voltage or current meter may be used. The deflections of the meter correspond to the intensity of the light intercepted by the photoelectric transducer and the voltage or electric current supplied by the transducer. In addition, it may be useful to employ a counter as an indicating means when an extensive measuring range, having a multiple of the wavelength of the measuring light, is to be covered. The counter functions to count the variations in light intensity that correspond to the measured changes in length brought about by interference. Thus, the counter displays a count value which, considering the wavelength of the measuring light, is completely proportional to the length, or amount of change in length, encountered by the sensing tip. A measurement is performed, for example, by first placing the sensing tip upon the starting point of the length to be measured. The counter is simultaneously reset to zero. The sensing tip is then allowed to proceed to the end value of the measured length, and the counter is read off. The procedure is repeated when another distance, or length, is to be measured.

To prevent a resetting of the counter and to be able to measure accurately the distances along different directions of the deflections of the sensing tip, it is useful to determine the direction of movement of the sensing tip, as stated in claim 9. Accordingly, it is useful for the counter to operate in dependence on the particular direction that the sensing tip moves, i.e. count either up or down. The counter may thus be in the form of an up and down counter. The direction of the movement of the sensing tip is determined by the measuring line which is effective, with the assistance of a coupling, to couple out a portion of the light from the reference waveguide. Such coupling has been described in the dissertation submitted by Dipl.-Ing. H. Schlaak, Berlin 1984, pages 28–29. The portion of light just described as having been "coupled out" is supplied, by means of a phase modulator, to another photoelectric transducer. Consequently, the phase position is shifted by 90° with respect to the phase position at the end of the reference waveguide. A phase modulator of the foregoing type has become known from the publication "Laser and Optoelektronik" No. 1, 1984, p. 27. FIG. 33. As the sensing tip executes its movements, the two photoelectric transducers emit two measuring potentials displaced by 90° with respect to each other. Together, the two measuring potentials form a rotary field having a direction of rotation which corresponds to the direction of movement of the sensing tip. The direction of counting by the up and down counter is thus controlled by the rotary direction. This mode of determining the direction of movement has been described separately for example, in the dissertation entitled "A Laser Interferometer for Photoelectric Motion Measurement in the Two Lateral Coordinates", submitted by Gerd Ulbers, 1981, University of Hannover, p. 58 ff, particularly p. 68, FIG. 29.

The above prior publication also describes a method of improving the accuracy of the measurement by subdividing the cycle of the rotary potential. See Section 10.4 of the publication. A further modification of the invention (according to claim 10) resides in such signal cycle subdivision being employed and in the inventive device for resolution enhancement.

In a particularly useful embodiment of the present invention (as recited in claim 11) the measuring waveguide, the reference waveguide, and the branch waveguide are formed, in a manner known per se, in or on the surface of a common plate (or board). Laser and/or photoelectric transducers are secured, in a straightforward manner, to the lateral edges of the plate where the waveguides also terminate. The mirror of the reference waveguide consists conveniently of a reflecting coating applied to the edge of the plate in the area where the reference waveguide terminates. The waveguides may be constructed in or on the plate by known means, either by the application of glass fibers onto the plate or by structuring the waveguides in the surface of the plate as it has been described, for example, in the publication "Laser und Optoelektronik", No. 1, 1984, p. 26, FIG. 31. Also, the phase adjusting means, for the embodiment according to claim 9, for example, can be directly applied to the surface of the plate, as it has become known from the above cited periodical "Laser und Optoelektronik", 1983, p. 112, FIG. 3. Finally, in accordance with yet another embodiment of the present invention, the optical means focuses the light from the measuring waveguide onto the measuring mirror and intercepts the light again as it is reflected by the mirror. The optical means may be disposed directly upon the surface of the plate in the form of a diffraction grating, pursuant to the above cited reference "LASER MAGAZINE", 1985, p. 75. As a whole, all optical or optoelectrical component parts, as well as the photoelectric transducers and/or the laser of the inventive device, may be integrated in one plate, with the smallest possible dimensions. Consequently, the device may be manufactured in a straightforward, simple and inexpensive manner. To keep out any effects of temperature fluctuations, the entire plate, including its optoelectronic components, is seated on a Peltier element.

BRIEF DESCRIPTION OF THE DRAWING

A preferred embodiment of the present invention is described herein in further detail, with reference to the drawing, wherein.

DETAILED DESCRIPTION OF THE PREFERRED EMBODIMENT

Figure 1:
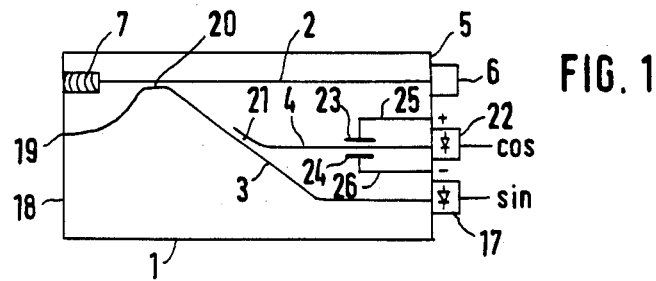
FIG. 1 is a top view of the essential optoelectronic portion of an embodiment of the present invention.

The optoelectronic device of FIG. 1 comprises a plate 1 (or board) made of lithium niobate crystal or silicon crystal. Structured in the surface of the plate 1, by a method known per se and explained in the foregoing portions of this specification, are a measuring waveguide 2, a reference waveguide 3, and a branch waveguide 4. The measuring waveguide 2 leads to an edge 5 of the plate 1, where a laser 6 is directly applied. The laser 6 is applied, by means of an adhesive, for example, so that its light beam is being passed into the measuring waveguide 2. At its other end, the measuring waveguide 2 terminates in a diffraction grating 7 by which the light is deflected substantially vertically with respect to the plate 1, as it is indicated by the arrow 8 in the side view of FIG. 2. The light impinges upon a triple mirror 9 by which it is reflected back to the diffraction grating 7, as indicated by the arrow 10. From the diffraction grating 7, the light is returned to the measuring waveguide 2. The beams of light extend substantially parallel, as it is indicated by the arrows 8 and 10.

The triple mirror 9 is attached to one end of an arm 11 of a two-arm lever 12. The other arm 13 of the lever 12 has attached to its extreme end a sensing tip 14 which is illustrated as being in contact with the surface 15 of a workpiece 16. The elevational profile of the surface 15 of the workpiece 16 is to be determined, for example, as a measure of the change in length in dependence of the profile direction.

The reference waveguide 3 shown in FIG. 1 extends up to the edge 5, where a photoelectric diode 17 is affixed so as to be capable of intercepting the light from the reference waveguide 3 and converting it into a corresponding electric current or voltage signal. The other end of the reference waveguide 3 extends up to the edge 18 of the plate. The edge is smoothly polished and is provided with a reflective coating. Thus, at least in the area where the reference waveguide 3 terminates, a reflector 19 is formed at that end of the reference waveguide 3.

For a short distance, the reference waveguide 3 approaches and runs alongside the measuring waveguide 2 so as to give rise to a coupling element 20. The branch waveguide 4 approaches with one end the reference waveguide 3 to form a coupling element 21. With its other end, the branch waveguide 4 terminates in the area of the photoelectric diode 22 by which the light from the branch waveguide 4 is intercepted and subsequently converted into a corresponding electric voltage signal. Over a short distance, electrodes 23 and 24 are disposed on either side of the branch waveguide 4. The electrodes 23 and 24 are connected by lines 25 and 26 to a variable direct voltage source. This is schematically indicated by plus and minus symbols. By adjusting the direct voltage at the electrodes 25 and 26, the phase position of the light at the photoelectric diode 22 is set with respect to the light at the photoelectric diode 17. Accordingly, the phase of the electric current at the outlet of the photoelectric diode 22 is displaced by 90° with respect to the phase of the electric current at the photoelectric diode 17.

Figure 2:
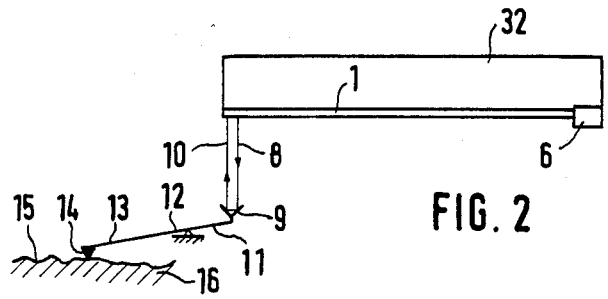
FIG. 2 is a side view of the embodiment of FIG. 1, including the mechanical sensing member of the device.
Figure 3:
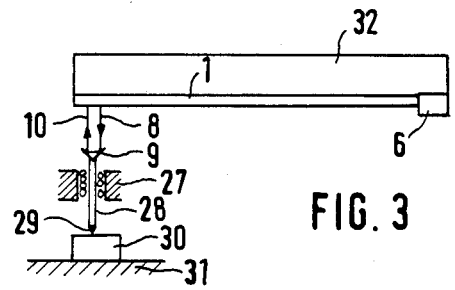
FIG. 3 is a side view of the present invention, showing a modification of the invention shown in FIG. 2.

To enhance stability, the plate 1 of FIGS. 2 and 3 is fixedly secured on a Peltier element 32 whose function it is to stabilize the temperature of the interferometer and to maintain it at a constant value.

To eliminate noise and drifting, the laser or the laser beam may be modulated by a carrier frequency which is subsequently modified by conventional techniques to be used in carrier frequency signal processing.

If, during operation of the device of FIGS. 1 and 2, the sensing tip 14 is displaced relative to the surface 15 of the workpiece 16 in the plane of the surface 15, the elevation position of the sensing tip 14 is changed pursuant to the fine profile of the surface 15. Correspondingly, the triple mirror 9 changes its position relative to the diffraction grating 7 on the plate 1, so that the path of the light along the arrows 8 and 10 toward the triple mirror 9 and back is also changed. The result is that the interference pattern in the reference waveguide 3 is modified in proportion to the movement of the sensing tip 14 and shows up at the photoelectric diode 17 as a change in the output current.

FIG. 3 illustrates a modification of the embodiment according to FIG. 1. Like parts are provided with like reference numerals. The difference is that the triple mirror 9 is disposed at the upper end of a measuring rod 28 vertically slidably mounted in a guide 27. Secured to the lower end of the measuring rod 28 is a sensing tip (sensor) 29 shown to be in contact with a workpiece 30 placed on a table 31.

Figure 4:
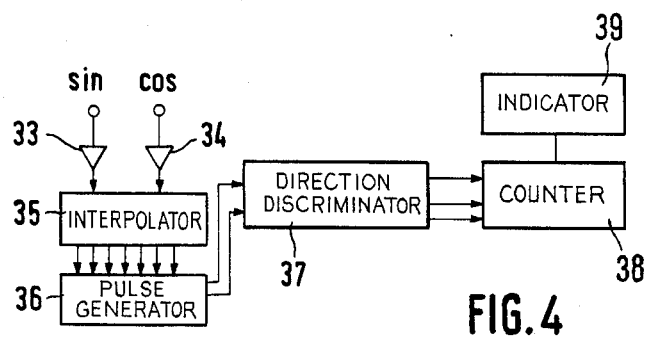
FIG. 4 is a block diagram of the indicating means forming a part of the optoelectronic device according to FIG. 1.

FIG. 4 is a block diagram for evaluation and indication of the output signals of the photoelectric diodes 17 and 22 which are shown as sine and cosine signals to clearly illustrate their phase position with respect to each other. Following voltage/current transformation and amplification in amplifiers 33 and 34, the rotating field interpolation is effected by a rotating field interpolator 35. The rotating field interpolator 35 is capable of subdividing a complete cycle of 360° of the rotating field into n divisions. A complete rotating field cycle corresponds to a displacement of the measuring mirror by λ/2 of the laser wavelength. The signal for the up and down counter 38 is worked up by a serially following square wave pulse generator 36 having a counting direction discriminator 37. Connected to the counter 38 is an indicator 39. Movement of the triple mirror 9 in one direction causes the signal at the photoelectric diode 22 to lead the signal at the photoelectric diode 17 by 90°, and the counter 38 is counting in one particular direction. Reversal of the direction of movement of the triple mirror 9 causes the signal at the photoelectric diode 22 to trail the signal at the photoelectric diode 17 by 90°. The up and down counter 38 also reverses its direction of counting. In each instance, the counter 38 counts n divisions (or parts) of cycles of the rotating field. The resolution thus achievable for the measuring stroke depends therefore solely on the magnitude of the subdivisions of the rotating field and on the stability of the system as a whole.

What is claimed is:

1. A device for measuring small distances, said device including a sensing tip mounted to be movable in the direction of the distance to be measured, a transducer for converting the movements of said sensing tip into corresponding electric signals, and indicating means for indicating said electrical signals, characterized in that said transducer comprises:

a laser for emitting light;
   an optical interferometer, said interferometer including first and second ends and a measuring waveguide, said first end interconnected to said laser;
   optical means, interconnected to said second end of said measuring waveguide, for focusing said light; and
   a measuring mirror, disposed at a distance from said optical means, for receiving said focused light and reflecting said light back to said optical means, said mirror being interconnected to said sensing tip;
   said interferometer further including a reference waveguide coupled to said measuring waveguide, at one end having disposed a mirror and at its other end having disposed a photoelectric transducer connected to said indicating means for indicating the electric output signal of the photoelectric transducer.

2. A device as claimed in claim 1, wherein said optical means comprises a diffraction grating for deflecting the light substantially parallel onto the mirror.

3. A device as claimed in claim 1, wherein said measuring mirror is secured at one end to a two-arm lever, the other arm of which carries said sensing tip.

4. A device as claimed in claim 1, wherein said measuring mirror is secured to one end of a parallel extending measuring rod, the other end of which carries said sensing tip.

5. A device as claimed in claim 1, wherein said measuring mirror is comprised of a plane mirror.

6. A device as claimed in claim 1, wherein said measuring mirror is comprised of a triple mirror.

7. A device as claimed in claim 1, wherein said measuring mirror is comprised of a glass sphere.

8. A device as claimed in claim 1, wherein said indicating means consists of a counter.

9. A device as claimed in claim 8, wherein said reference waveguide is linked to a branch waveguide, one end of said waveguide being interconnected to another photoelectric transducer and being provided with phase adjusting means for adjusting the phase at said other photoelectric transducer, such that the phase of the light at said other photoelectric transducer is displaced by 90° with respect to the phase of the light at the photoelectric transducer interconnected to said reference waveguide, whereby a rotating field is formed, and
   means for determining the direction of rotation of the rotating field and, consequently, the direction of counting of the counter, said counter being constructed as an up and down counter.

10. A device as claimed in claim 9, wherein division means are provided for subdividing a cycle of the rotating field into a number of separate values, and wherein said separate values are counted by said up and down counter.

11. A device as claimed in claim 1, wherein the measuring waveguide, reference waveguide, and the branch waveguide are formed about the surface of a common plate, wherein the laser and the photoelectric transducer are directly disposed at an edge of the plate, at which edge the respective ends of the said waveguides terminate, and wherein the mirror disposed at one end of the reference waveguide is comprised of a reflecting coating applied to the lateral edge of the plate up to which said reference waveguide extends.

12. A device as claimed in claim 9, wherein the measuring waveguide, reference waveguide, and the branch waveguide are formed about the surface of a common plate, wherein the laser and the photoelectric transducers are directly disposed at an edge of the plate, at which edge the respective ends of the said waveguides terminate, and wherein the mirror disposed at one end of the reference waveguide is comprised of a reflecting coating applied to the lateral edge of the plate up to which said reference waveguide extends.

13. A device as claimed in claim 11, wherein said phase adjusting means consist of two electrodes which extend on each side of the branch waveguide and are connected to an adjustable direct voltage source.

14. A device as claimed in claim 12, wherein said phase adjusting means consist of two electrodes which extend on each side of the branch waveguide and are connected to an adjustable direct voltage source.

15. A device as claimed in claim 11, wherein said optical means focusing the light onto said measuring mirror consists of a diffraction grating disposed on the surface of the plate.

16. A device as claimed in claim 12, wherein said optical means focusing the light onto said measuring mirror consists of a diffraction grating disposed on the surface of the plate.

17. A device according to claim 1, wherein said photoelectric transducers and laser are integrated in the plate.

* * * * *